INVENTORS
ROBERT G. STERN
ALBERT J. SHERMAN their ATTORNEY.

INVENTORS
ROBERT G. STERN
ALBERT J. SHERMAN
their ATTORNEY.

Nov. 4, 1958    R. G. STERN ET AL    2,858,623
FLIGHT COMPUTING SYSTEM
Filed June 14, 1954    3 Sheets-Sheet 3
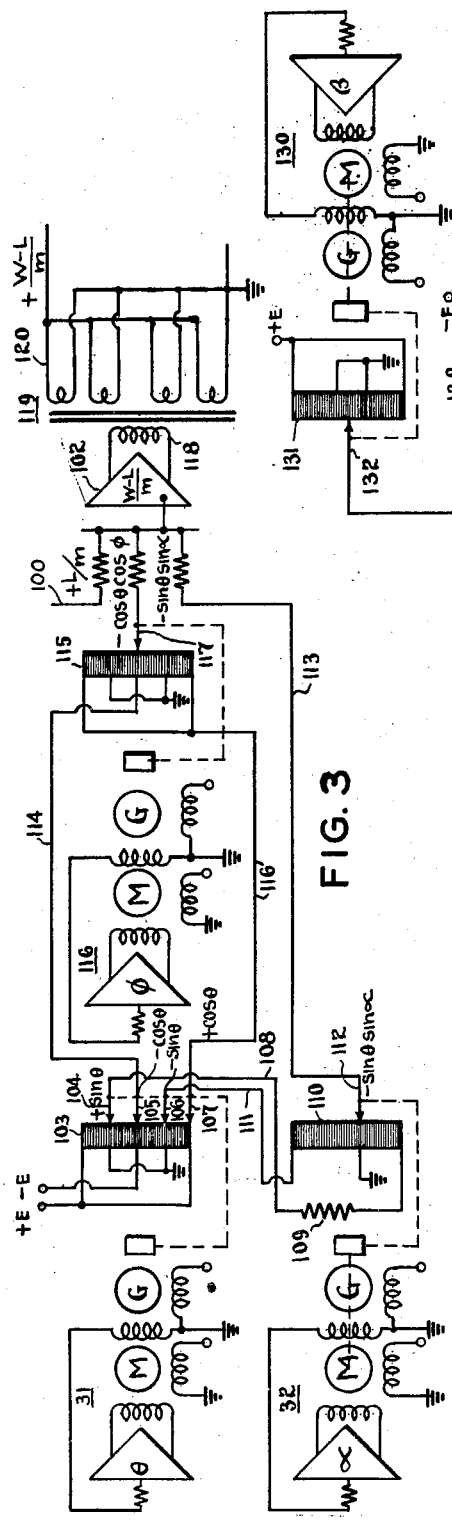
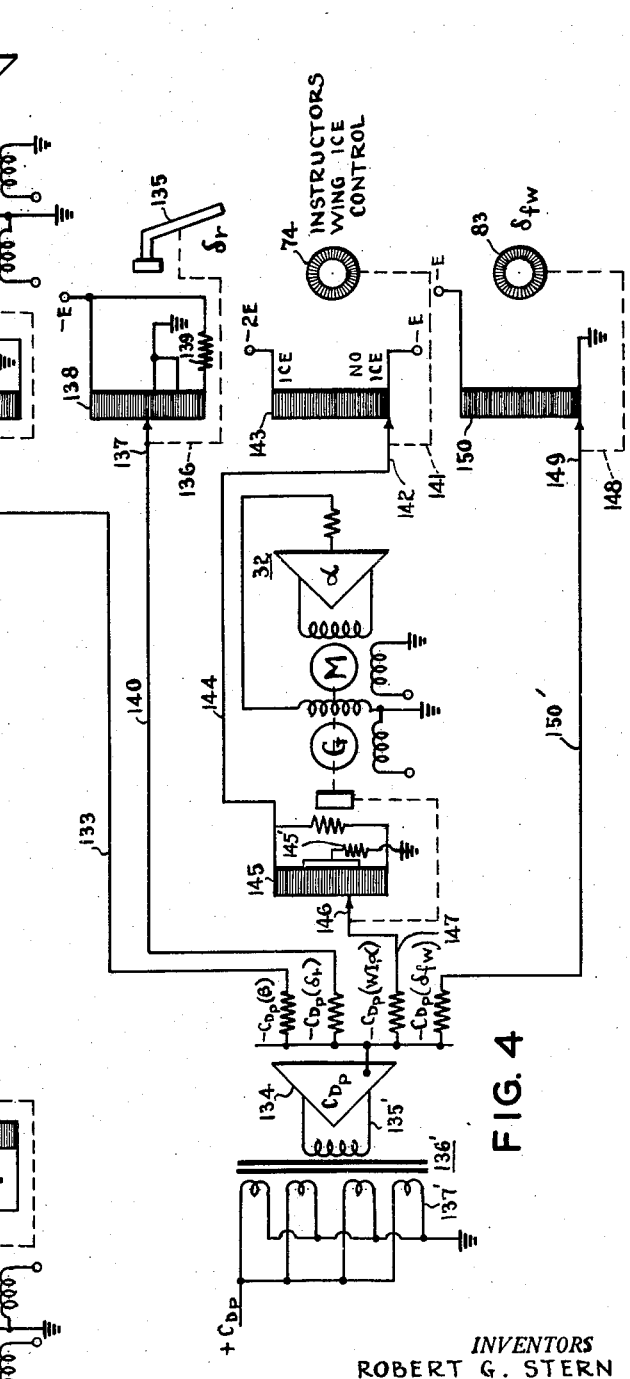
*INVENTORS*
ROBERT G. STERN
ALBERT J. SHERMAN
*their* ATTORNEY.

2,858,623

FLIGHT COMPUTING SYSTEM

Robert G. Stern, West Caldwell, N. J., and Albert J. Sherman, New York, N. Y., assignors to Curtiss-Wright Corporation, a corporation of Delaware Application June 14, 1954, Serial No. 436,532

2 Claims. (Cl. 35—12)

This invention relates to flight trainers and more particularly to apparatus for computing flight conditions such as occur in the actual flight of an aircraft.

Flight trainers have heretofore been provided with apparatus for computing various flight conditions including airspeed. A number of factors were introduced into the computation of air speed including engine thrust, gravity, and drag. Drag, the effect of which is to decrease air speed was computed according to the formula:

$$D = C_D \rho \frac{v^2 S}{2}$$

where D is the drag, $C_D$ is an overall drag coefficient, $\rho$ is the density of air, $v$ represents the air speed and S is the projected wing area. The formula lumps together items of parasitic and induced drag to approximate the total drag on the aircraft which is simulated by the trainer. Whereas various methods have been used heretofore in determining total drag, it is preferable for the purpose of more accurately determining drag, to compute induced drag separately. It is especially important in accurately determining drag for large angles of attack and low speeds that the induced drag be separately computed. In addition to computing induced drag separately, it is desirable to compute separate items of parasitic drag such as associated with angle of attack, side-slip, wing ice, rudder angle and wing flap position in order to more accurately determine the total drag.

It is an object of this invention to provide in trainer apparatus for computing flight conditions, novel and improved means for more accurately determining drag than heretofore, wherein items of induced and parasitic drag are separately computed.

It is another object of this invention to provide in trainer apparatus for computing flight conditions, novel and improved drag computing means of the described type wherein induced drag is computed by suitable apparatus as a function of normal acceleration and coefficient of lift.

It is still another object of this invention to provide a novel and improved flight training apparatus which is particularly adapted to provide for the accurate determination of air speed.

The invention will be more fully set forth in the following description referring to the accompanying drawings, and the features of novelty will be pointed out with particularity in the claims annexed to and forming a part of this specification.

Figure 1:
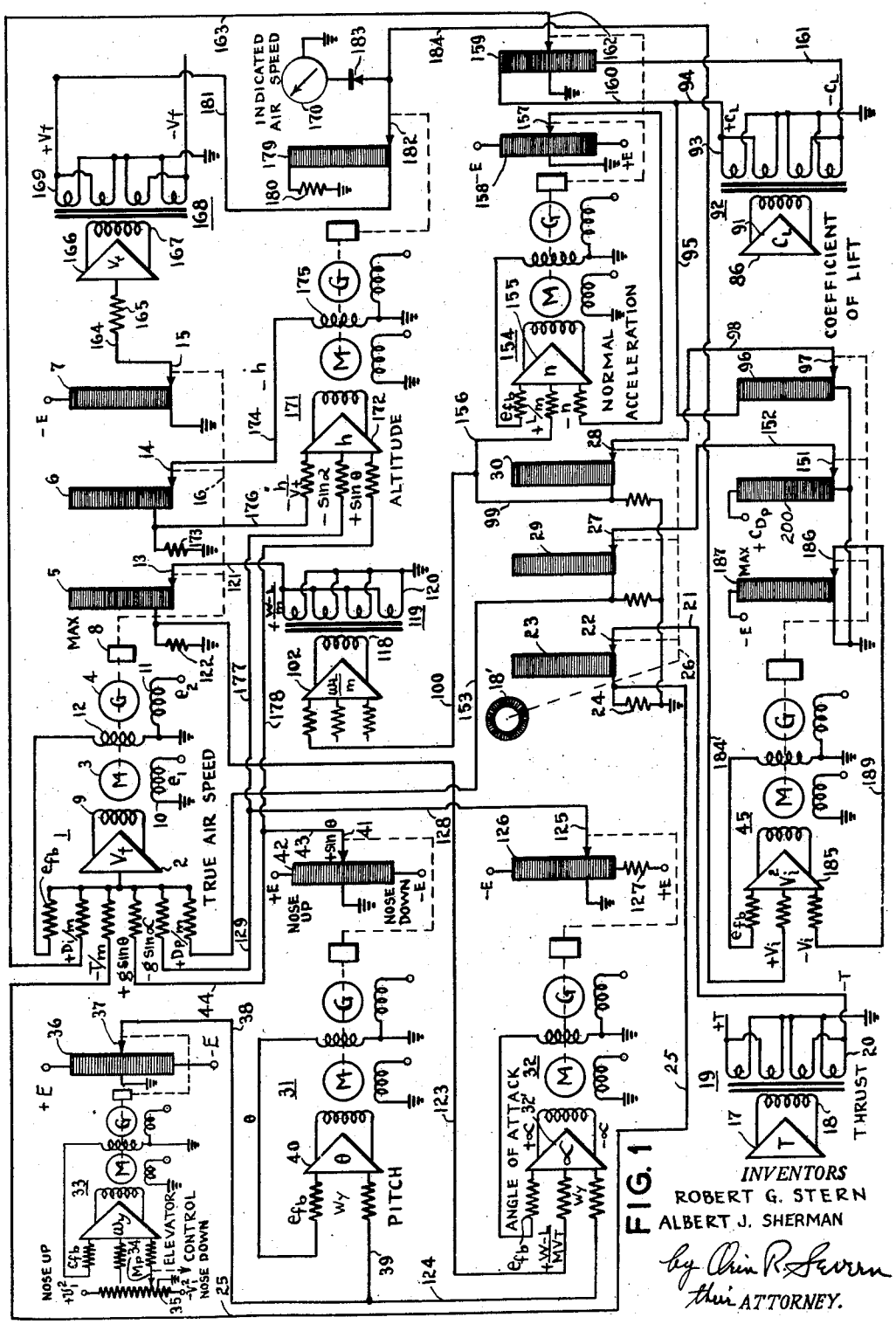
Figure 2:
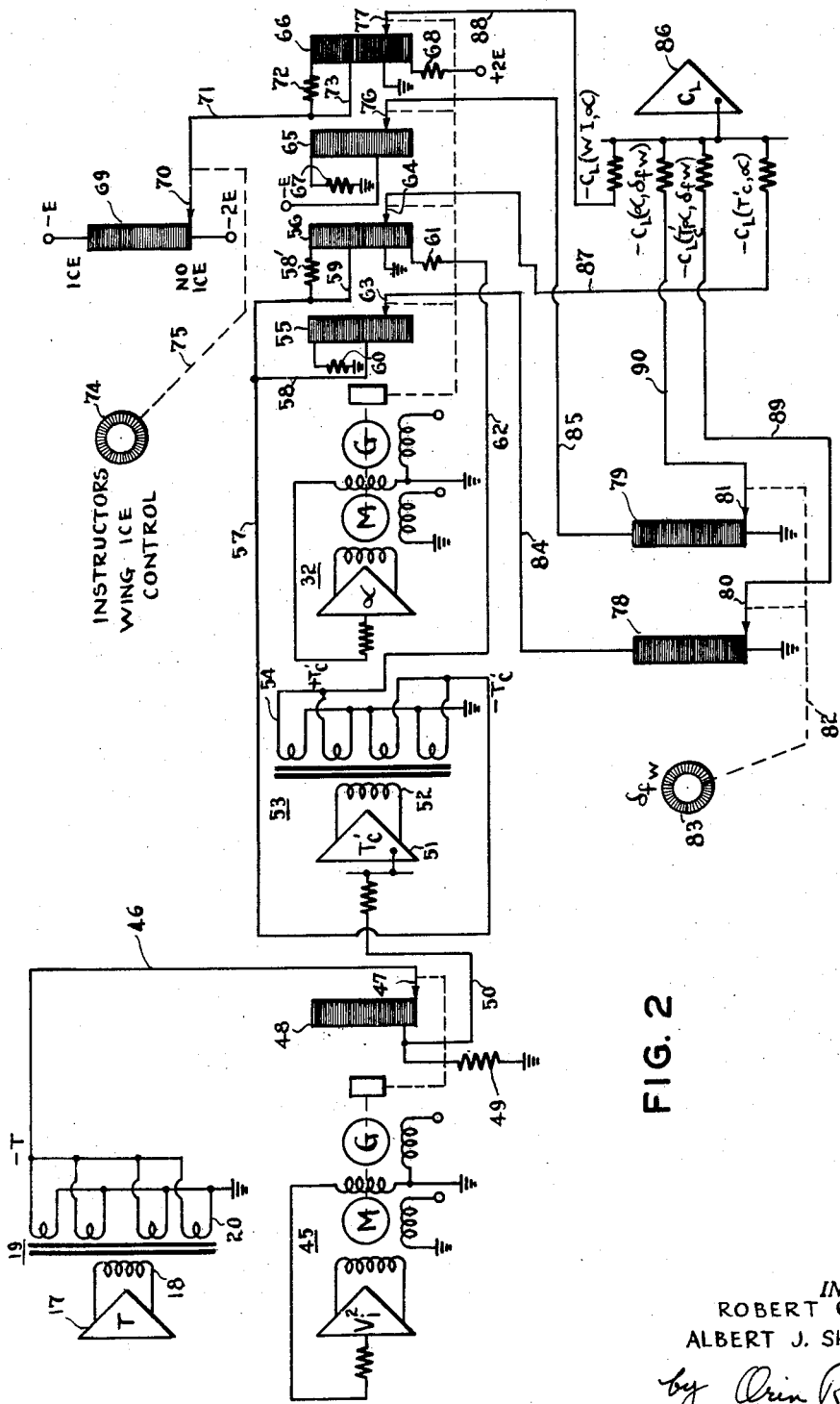

Referring to the drawings Fig. 1 is a schematic illustration showing flight training apparatus which incorporates the features of this invention; Figs. 2, 3 and 4 show additional control circuitry tying in with various components of the flight training apparatus of Fig. 1.

Referring to Fig. 1, the flight training apparatus includes a true air speed servo ($V_t$), designated by the reference character 1, which is provided to compute true air speed according to the determining factors, including engine and/or propeller thrust, gravity components, and drag (both parasitic and induced). This servo is typical of other servo systems shown in the drawings. Referring to the true air speed servo ($V_t$) as an example of the various servo systems, such servo includes a servo amplifier 2 to which are applied a number of controlled voltages hereinafter considered in detail, a motor 3 responsive to the amplifier output, a feed-back generator 4 driven by the motor 3, and a number of potentiometers as for example 5, 6 and 7 having their slider contacts connected through a gear reduction box 8 to the motor generator combination. Servo amplifier 2 is a summing amplifier for determining the resultant of the input voltages and is of a type well-known in the art for algebraically summing a plurality of A. C. voltages of varying magnitude and polarity. A detailed circuit illustration of the servo amplifier is therefore unnecessary.

The servomotor 3 is of the two-phased type, having a control phase 9 which is energized by the amplifier output, and another phase 10 which is energized by a constant reference A. C. voltage $e_1$ dephased 90° from the control voltage. The operation of this type of motor is well-known, rotation being in one direction when the control and reference voltages of the respective phases have the same instantaneous polarity, and in the opposite direction when the instantaneous polarity of the control voltage is reversed with respect to the reference voltage, the rate of rotation in both cases depending on the magnitude of the control voltage. The generator 4 which is driven by the servomotor is a two-phased generator having one phase 11 energized by a 90° de-phased A. C. reference voltage $e_2$, the other phase 12 generating according to the motor speed a feed-back voltage $e_{fb}$ for purposes of velocity control.

The potentiometer resistance elements such as 5, 6 and 7 of the true air speed servo ($V_t$) and the other potentiometers shown in the drawings may be of the well-known wound card type and are of circular band form in practice, but are diagrammatically illustrated in plane development for clarity. A structural arrangement that may be conveniently used for a servomotor and potentiometer combination of the character above referred to is shown in Patent Number 2,341,749 issued December 2, 1947 to R. B. Grant for "Potentiometer Housing and Positioning Structure."

Potentiometer cards 5, 6 and 7 are provided with slider contacts such as 13, 14 and 15 respectively which are positioned along the respective cards by the servomotor which connects with the slider contact through the gear reduction box 8 and suitable mechanical connections 16. The slider contacts derive, i. e. pick off potentiometer voltages depending on the respective contact position. Each potentiometer for the various servos shown in the drawings is shaped or contoured, and designed with suitable shunting resistances where required so that the derived voltages at the potentiometer contacts bear a certain relationship to linear movement of the slider contacts depending upon the particular function of the potentiometer, and has a voltage impressed across its terminals depending as to instantaneous polarity and magnitude also upon the function of the potentiometer.

In accordance with our invention the true air speed servo ($V_t$) computes true air speed according to the magnitude of control voltages representing the effects of thrust, gravity, parasitic drag, and induced drag on the speed of the aircraft for any flight attitude. As indicated in the drawing the various input signals to the amplifier 2 of the true air speed servo ($V_t$) are $$\frac{T}{m}$$

$$+g \sin \theta, \ -g \sin \alpha$$

$$+\frac{D_p}{m} \text{ and } +\frac{D_i}{m}$$

The input signal $$-\frac{T}{m}$$

represents the effect of thrust which propels the aircraft ahead, and the signals $+g \sin \theta$ and $-g \sin \alpha$ together represent the effect of gravity which may act to increase or decrease air speed depending upon the aircraft attitude, whereas the signals $$+\frac{D_p}{m} \text{ and } +\frac{D_i}{m}$$

respectively represent the effect of parasitic and induced drag which tend to decrease air speed. All of the various input signals have been reversed in sign, i. e. those items tending to increase air speed are represented by a signal having a negative sign and those items tending to decrease air speed are represented by signals which are prefaced by a positive sign. Since all the signs of the various input signals are reversed with respect to the physical state of affairs the servo may nevertheless be operated to compute true air speed, rotation being in one direction as air speed increases and in the opposite direction as air speed decreases. Actually the input signals to servo amplifier 2 represent in summation acceleration of the aircraft and such input quantities are integrated in the servo so that the servo position at any particular time corresponds to the true air speed of the aircraft.

The input signal $$-\frac{T}{m}$$

to the true air speed servo amplifier 2 is determined according to the output of an amplifier 17 which sums a number of control voltages to provide an output voltage representing thrust, and according to the setting of a dial 18' which may be positioned by an instructor for introducing the factor of variable gross weight into the computing apparatus. Summing amplifier 17 has input voltages such as indicated in a pending application of Albert J. Sherman for "Simulated Thrust Computing System" S. N. 436,546 of even date assigned to the same assignee as the present invention. The amplifier is connected to the primary 18 of a transformer 19 which has the negative output terminal of its secondary 20 connected over line 21 to the slider contact 22 of load potentiometer 23. The potentiometer 23 as shown connects at one end through a resistor 24 to ground, and at the same time connects over line 25 with the true air speed servo amplifier 2. Potentiometer 23 is a dividing potentiometer having an output which is determined according to the voltage at slider contact 22 and according to the position of the slider contact. The voltage at slider contact 22 which connects over line 21 with the transformer secondary 20 at its negative output terminal is the voltage output at such terminal, $-T$ representing thrust. The position of the slider contact 22 on potentiometer card 23 is determined by the setting of dial 18' which connects with the slider contact by means of suitable mechanical connections 26. The dial is positioned by an instructor according to a supposed loaded weight for the aircraft, the dial being so calibrated that the output voltage of potentiometer 23 appearing in line 25 provides an input signal $$-\frac{T}{m}$$

to amplifier 2 representing as a negative quantity the thrust divided by the mass of the aircraft. The instructor's dial 18' which has been referred to also controls the position of slider contacts 27 and 28 of other load potentiometers 29 and 30 respectively which are used for purposes hereinafter set forth. A position for the slider contacts 22, 27 and 28 at the lower end of each of cards 23, 29 and 30 respectively corresponds to a lightly loaded condition of the aircraft, whereas a position for the slider contacts farther up the cards corresponds to a greater degree of loading.

Considering now the input signals $+g \sin \theta$ and $-g \sin \alpha$ to servo amplifier 2 representing the effect of gravity on air speed, where $g$ is acceleration due to gravity, $\theta$ is the angle of pitch, and $\alpha$ is the angle of attack; such input signals are determined in accordance with the operation of a pitch servo $(\theta)$ designated by the reference character 31, and angle of attack servo $(\alpha)$ bearing the reference character 32. Operation of the pitch servo $(\theta)$ is in turn dependent upon the operation of a rate of pitch servo $(\omega_y)$, and the operation of the angle of attack servo $(\alpha)$ is dependent upon the operation of the rate of pitch servo $\omega_y$, true airspeed servo $(V_t)$, a $(V_i^2)$ servo, the setting of the aircraft loading dial 18', and upon a control voltage representing coefficient of lift $(C_L)$.

The rate of pitch servo $(\omega_y)$ which is indicated by reference character 33 is controlled in a manner indicated in U. S. Patent No. 2,687,580, granted on August 31, 1954 to Richard Carl Dehmel, and as shown includes input signal $(M_p)$ representing a pitching moment derived according to the movement of slider contact 34 on potentiometer 35. Potentiometer 35 is energized at opposite ends by A. C. voltages opposite in sign representing indicated velocity square $(V_i^2)$, the voltages being derived from the $V_i^2$ servo 45 in a well-known manner, for example in the same manner as the voltages $+V_T$ and $-V_T$ are derived from the $V_T$ servo 1 as hereinafter described. The servo 45 per se operates in a manner hereinafter indicated. The slider contact 34 is moved along the potentiometer 35 as indicated in the aforesaid Patent No. 2,687,580 in accordance with the operation of an elevator control. The $\omega_y$ servo includes a potentiometer 36 having a slider contact 37 which is moved along the potentiometer card according to the resultant of the input signals to the $\omega_y$ servo. As further indicated in Patent No. 2,687,580 potentiometer card 36 is energized at opposite ends by positive and negative reference voltages $+E$ and $-E$ respectively and is grounded at the midpoint. Slider contact 37 connects over lines 38 and 39 with the servo amplifier 40 of the pitch servo $(\theta)$, and a voltage derived at contact 37 determines the input signal $\omega_y$ to the amplifier 40 representing the rate of change of angle of pitch. The only other signal fed to the amplifier 40 of the pitch servo is a feed-back signal $e_{fb}$ generated by the servo generator. Accordingly the pitch servo which is an integrating servo is operated to a position determinative of the pitch angle. Operation of the pitch servo results in positioning a slider contact 41 along potentiometer card 42, the potentiometer card being energized at opposite sides by a positive and negative A. C. voltage $+E$ and $-E$ respectively, and being grounded at its mid-point. The potentiometer card is wound cosinusoidally to provide for the derivation of a sine function at contact 41. As indicated slider contact 41 connects over lines 43 and 44 with the true air speed servo amplifier providing for the input signal $-g \sin \theta$. As will be apparent from the drawing a position for the pitch servo corresponding to a position of slider contact 41 at the mid-point of potentiometer card 42 indicates a pitch angle of 0, whereas a position for the pitch servo and corresponding position for slider contact 41 on the positive side of the card indicates a positive angle of pitch. A position for the pitch servo and corresponding position for slider contact 41 on the negative side of the potentiometer card 42 indicates a negative angle of pitch.

As has previously been indicated the input signal $-g \sin \alpha$ to the true air speed servo amplifier 2 is dependent upon operation of an angle of attack servo $(\alpha)$ designated by the reference character 32 which in turn is dependent upon the operation of rate of pitch servo $(\omega_y)$, true airspeed servo $V_t$, a $(V_i^2)$ servo bearing the reference character 45, the setting of aircraft loading dial 18′, and upon a control voltage representing coefficient of lift ($C_L$). Derivation of the coefficient of lift voltage ($C_L$) as a control factor in the operation of the angle of attack servo ($\alpha$) will be first considered, reference being made to Fig. 2 wherein apparatus for deriving such voltage is shown.

Included in the apparatus for deriving the coefficient of lift voltage $C_L$ is transformer 19, the ($V_i^2$) servo 45 and the ($\alpha$) servo 32. The transformer 19 is connected at the negative output terminal of the secondary winding 20 over a line 46 with the slider contact 47 of a potentiometer 48 included in the ($V_i^2$) servo system. Potentiometer 48 is a dividing potentiometer which as shown connects near one end through a resistor 49 with ground. The slider contact 47 is positioned along the potentiometer card according to the operation of the ($V_i^2$) servo to provide an output voltage for the potentiometer 48 determined by the quotient $$-\frac{T}{V_i^2}$$

The output voltage of the potentiometer is fed over line 50 to an amplifier 51 which connects with the primary 52 of transformer 53, transformer 53 providing the voltages $+T'_C$ and $-T'_C$ representing thrust coefficient at the positive and negative terminals respectively of its secondary winding 54.

The negative output terminal of the secondary winding 54 of transformer 53 connects with potentiometers 55 and 56 of the angle of attack ($\alpha$) servo. As shown the negative output terminal of the secondary winding 54 connects over lines 57 and 58 with potentiometer 55 at an intermediate point thereof. The negative terminal connects with potentiometer 56 over line 57, a resistor 58′ and the line 59 to one end of the potentiometer and to an intermediate point. As shown, potentiometer 55 connects near one end through a resistor 60 with ground, whereas potentiometer 56 is grounded at an intermediate point and connects through the resistor 61 and over line 62 with the positive output terminal of secondary winding 54. Potentiometers 55 and 56 include slider contacts 63 and 64 respectively which are moved along the potentiometer cards according to the operation of the angle of attack servo ($\alpha$), voltages being derived at the slider contacts as a function of the thrust coefficient $T'_C$ and angle of attack $\alpha$ for use in computing components of the coefficient of lift voltage $C_L$. The angle of attack servo ($\alpha$) includes other potentiometers 65 and 66, the potentiometer 65 being connected at one end through a resistor 67 to ground and energized at an intermediate point by the negative A. C. voltage $-E$. Potentiometer 66 connects to ground at an intermediate point and is energized at its one end which connects through resistor 68 with a positive A. C. voltage $+2E$, whereas the potentiometer is energized at the other end and at an intermediate point according to the output voltage at the slider contact of another potentiometer card 69. As shown potentiometer 69 has its slider contact 70 connected to potentiometer 69 over line 71, resistor 72, and connection 73. The slider contact 70 is moved along the card 69 by means of the instructor's wing ice control dial 74 which is connected with contact 70 by suitable mechanical connections 75, and a voltage is derived at contact 70 representing an amount of wing ice as determined by the instructor. The card 69 is energized as shown in the drawing at opposite ends by the A. C. voltages $-E$ and $-2E$ respectively, and a position for slider contact 70 at the one end of the card resulting in a derived voltage of $-2E$ corresponds to a condition of no ice, whereas a position for the slider contact 70 at the other end of the card resulting in a derived voltage of $-E$ corresponds to a condition of maximum ice. The potentiometer cards 65 and 66 of the angle of attack servo ($\alpha$) include the slider contacts 76 and 77 respectively which are moved along the card according to the operation of the angle of attack servo, voltages being derived at the slider contacts for use in the determination of the coefficient of lift voltage $C_L$.

In order to take into account the position of the aircraft flaps in the derivation of the coefficient of lift voltage $C_L$ potentiometers 78 and 79 having slider contacts 80 and 81 respectively positionable through mechanical connections 82 by a student pilot's flap control dial 83 are provided. Potentiometers 78 and 79 are energized at corresponding ends as shown by the derived voltages at slider contacts 63 and 76 which respectively connect with the potentiometer cards 78 and 79 over lines 84 and 85. The other ends of cards 78 and 79 are connected to ground. A voltage is derived at each of slider contacts 80 and 81 according to the flap angle designated in the drawing as ($S_{fw}$) which angle is determined by the student pilot. A position for the slider contacts 80 and 81 at the grounded ends of potentiometers 78 and 79 corresponds to a flap angle of 0, whereas a position for the slider contacts farther up along the cards corresponds to a greater angle.

The slider contacts 64, 77, 80 and 81 of potentiometers 56, 66, 78 and 79 respectively which have been referred to hereinbefore connect with amplifier 86 providing input signals thereto. Slider contact 64 connects with amplifier 86 over line 87 to provide the input signal $-C_L (T'_C \alpha)$ which is a function of thrust coefficient $T'_C$ and the angle of attack $\alpha$. The slider contact 77 connects over line 88 with amplifier 86 providing input signal $-C_L (WI, \alpha)$ which signal is a function of wing ice as predetermined by the instructor and the angle $\alpha$. Slider contact 80 connects over line 89 with amplifier 86 to provide input signal $-C_L (T'_C, \alpha, S_{fw})$, such signal being a function of the thrust coefficient $T'_C$, angle $\alpha$, and the flap angle $S_{fw}$. Slider contact 81 connects with amplifier 86 over line 90 to provide the input signal $-C_L (\alpha, S_{fw})$ which is a function of the angle of attack $\alpha$ and the flap angle $S_{fw}$. The various potentiometer cards referred to as entering into the derivation of the coefficient of lift voltage $C_L$ are all contoured so that the input signals to the amplifier 86 represent in summation the coefficient of lift voltage $C_L$.

As shown (Fig. 1) the amplifier 86 connects with the primary 91 of a transformer 92 having a secondary winding 93 which provides the positive output voltage $+C_L$ and a negative output voltage $-C_L$ at its positive and negative terminals respectively. The positive output voltage $+C_L$ representing coefficient of lift is fed over connection 94 and line 95 to one end of a potentiometer card 96 of the ($V_i^2$) servo 45. Potentiometer 96 has its other end connected to ground. Potentiometer 96 includes a slider contact 97 which is moved along the potentiometer card according to the operation of the ($V_i^2$) servo for deriving a voltage representing lift. Such derived voltage at contact 97 is fed over line 98 to the slider contact 28 of the potentiometer 30. The potentiometer 30 is a dividing potentiometer having its slider contact 28 positioned according to the setting of the aircraft loading dial 18′, and the potentiometer has an output voltage depending upon the position of the slider contact 28 which output voltage is fed over lines 99 and 100 to the amplifier 102 to provide an input signal $$+\frac{L}{m}$$

for the amplifier representing lift divided by the mass of the aircraft.

In addition to the input signal $$+\frac{L}{m}$$

other input signals, namely $-\cos \theta \cos \phi$ where $\phi$ designates angle of roll, and $-\sin \theta \sin \alpha$ which are derived by means of apparatus shown in Fig. 3 are provided for amplifier 102. As shown the pitch servo ($\theta$) includes potentiometer card 103 which is contoured to provide for the derivation of voltages $+\sin \theta$, $-\cos \theta$, $-\sin \theta$, and $+\cos \theta$ at the slider contacts 104, 105, 106, and 107 respectively which are positioned along the card according to the operation of the pitch servo. Potentiometer card 103 is energized at opposite ends by the A. C. voltage $+E$ and at the mid-point by the A. C. voltage $-E$. The card is connected to ground mid-way between the center of the card and opposite ends. Slider contact 104 is operated along the portion of the card extending between points energized by the voltages $+E$ and $-E$ respectively, such portion of the card being wound cosinusoidally to provide for the derivation of the voltage $+\sin \theta$ at contact 104. Contact 105 is operated over that portion of the card extending between the grounded points, and this portion is wound sinusoidally to provide for the derivation of the voltage $-\cos \theta$ at contact 105. The contact 106 functions over a cosinusoidally wound portion of the card extending between the points energized by the voltages $+E$ and $-E$ to effect the derivation of the voltage $-\sin \theta$, and contact 107 functions over a sinusoidally wound portion of the card between points connected to ground and the voltage $+E$ thereby providing for the derivation of the voltage $+\cos \theta$.

Slider contact 104 connects over line 108 and through resistor 109 with one end of a potentiometer 110 included in the angle of attack ($\alpha$) servo, and slider contact 106 connects over line 111 to the other end of the potentiometer 110. The potentiometer card connects with ground at an intermediate point. The potentiometer includes slider contact 112 which is moved along the card in accordance with the operation of the angle of attack ($\alpha$) servo to provide an output voltage $-\sin \theta \sin \alpha$ at contact 112 which voltage is fed over line 113 as an input signal to the amplifier 102. Slider contact 105 connects over line 114 with the mid-point of the potentiometer card 115 of the angle of roll servo ($\phi$) designated by the reference character 116 and controlled in the manner set forth in the aforementioned Patent No. 2,687,580. Slider contact 107 connects over line 116' with opposite ends of the potentiometer card 115, which card is grounded mid-way between the points connected to slider contact 105 and 107 respectively. The potentiometer card 115 includes slider contact 117 which is operated along the card according to the operation of the angle of roll servo ($\phi$) to provide for the derivation of a voltage at slider contact 117 which is fed to the amplifier 102 as input signal $-\cos \theta \cos \phi$. The potentiometer card 115 is sinusoidally wound.

The input signals $$+\frac{L}{m}$$

$-\cos \theta \cos \phi$, and $-\sin \theta \sin \alpha$ to amplifier 102 are summed therein to provide a voltage $$\frac{W-L}{m}$$

where W designates the weight of the aircraft, L is the lift, and $m$ is the aircraft mass. As shown amplifier 102 connects with the primary winding 118 of a transformer 119 having a secondary winding 120 providing output voltage $$+\frac{W-L}{m}$$

at its positive output terminal which connects over the line 121 (Fig. 1) with the slider contact 13 of the true air speed ($V_t$) potentiometer 5. Slider contact 13 is moved along the potentiometer card in accordance with the operation of the ($V_t$) servo to provide an output voltage according to the position of slider contact 13 dependent upon the quotient of the voltage $$\frac{W-L}{m}$$

and a voltage $V_t$ representing true air speed. The potentiometer 5 is returned to ground from a point near its one end through the resistor 122 and the output voltage of the potentiometer is tapped off at such point and fed over line 123 to provide the input signal $$+\frac{W-L}{mV_t}$$

to the angle of attack servo ($\alpha$).

In addition to the input signal $$+\frac{W-L}{mV_t}$$

the angle of attack servo ($\alpha$) is provided with another input signal $\omega_y$ by reason of the connection of the servo amplifier 32' over lines 124 and 38 with the slider contact 37 of the ($\omega_y$) servo potentiometer 36. The only other input signal to the angle of attack servo is the feed-back signal $e_{fb}$. The angle of attack servo which is an integrating servo is operated to a position representative of the angle of attack $\alpha$ and in accordance with such operation slider contact 125 is moved along cosinusoidally wound card 126 which as shown connects at one end with the A. C. voltage $-E$ and connects at the other end through a resistor 127 with the A. C. voltage $+E$, the potentiometer card being grounded at an intermediate point. A voltage is thereby derived at contact 125 which is fed over lines 128 and 129 to provide the input signal $-g \sin \alpha$ for the $V_t$ servo amplifier 2.

The input signal $$-\frac{T}{m}$$

representing the effect of thrust on true air speed and the signals $+g \sin \theta$ and $-g \sin \alpha$ representing the effect of gravity on true air speed all having been considered, the derivation of the input signal $$+\frac{D_p}{m}$$

to the true air speed servo will now be presented. As hereinbefore indicated, the input signal $$+\frac{D_p}{m}$$

represents the effect of parasitic drag on true air speed. In the computation of the parasitic drag item, the factors of side-slip ($\beta$), rudder angle ($S_r$), wing ice (WI), and flap angle ($S_{fw}$) are taken into account. As shown in Fig. 4 a side-slip servo ($\beta$) bearing the reference character 130 includes a potentiometer 131 having a slider contact 132 which is moved along the potentiometer card according to the operation of the servo. The potentiometer card is energized at opposite ends by the A. C. voltage $+E$ and is connected to ground at intermediate points as illustrated. By reason of the movement of slider contact 132 along potentiometer card 131 a voltage is derived at the slider contact which is fed over line 133 to provide an input signal $-C_{D_D}(\beta)$ to summing amplifier 134. The side-slip servo ($\beta$) may be controlled as shown in the aforementioned Patent No. 2,687,580. In addition to input $-C_{D_D}(\beta)$ which is a function of the side-slip, other input signals are provided for the amplifier including input signal $-_{D_p}(Sr)$ which is a function of rudder angle.

Rudder angle is dependent upon the position of the rudder pedal 135 which is connected as shown by suitable mechanical connections 136 to a slider contact 137 of potentiometer 138. The potentiometer 138 connects at one end to the negative A. C. voltage —E and connects at its other end to such A. C. voltage —E through the resistor 139. The potentiometer is connected to ground at spaced intermediate points. Movement of the rudder pedal 135 to a position corresponding to a selected rudder angle ($S_r$) operates slider contact 137 such that a voltage is derived at the slider contact representative of the rudder angle which voltage is fed over line 140 to provide input signal $-C_{D_p}(S_r)$.

Two additional signals are provided as inputs to the summing amplifier 134, namely input signal $-C_{D_p}(WI, \alpha)$ which is a function of wing ice and angle of attack, and input signal $-C_{D_p}(S_{fw})$ which is a function of flap angle. Input signal $-C_{D_p}(WI, \alpha)$ is computed according to the setting of instructor's wing ice control dial 74 and the operation of the angle of attack servo ($\alpha$). The instructor's wing ice control dial is connected by suitable mechanical means 141 with slider contact 142 of potentiometer 143, the potentiometer being energized at opposite ends by A. C. voltages —E and —2E respectively. The slider contact 142 is positioned along the potentiometer card by the dial 74 and a voltage is derived at the contact which represents a particular weight of ice on the aircraft wing. A position for slider contact 142 at one end of potentiometer card 143 which connects with the energizing voltage —2E corresponds to a condition of maximum ice whereas a position for the slider contact at the other end of the potentiometer card corresponds to a condition of no ice. The voltage derived at slider contact 142 is fed over line 144 to both ends of a potentiometer card 145 which is included in the angle of attack ($\alpha$) servo system. Potentiometer card 145 is returned to ground through a resistor 145' at a point intermediate its ends and has a slider contact 146 which is positioned along the card according to the operation of the angle of attack ($\alpha$) servo, a voltage being derived at the slider contact which is fed over line 147 to amplifier 134 providing the input signal $-C_{D_p}(WI, \alpha)$. The input signal $-C_{D_p}(S_{fw})$ is dependent upon the position of the flap control dial 83. Such dial is positioned by a student pilot according to a selected flap angle $S_{fw}$. The dial connects by suitable mechanical connections 148 with slider contact 149 of a potentiometer 150 so that the slider contact is correspondingly positioned along the potentiometer card. As shown the potentiometer card 150 is energized at one end by the negative A. C. voltage —E whereas the other end is connected to ground. A voltage is derived at the slider contact 149 according to the setting of the dial 83 as determined by a student pilot, and such voltage is fed over line 150' to provide input signal $-C_{D_p}(S_{fw})$ for summing amplifier 134.

The various potentiometer cards entering into the derivation of the input signals $-C_{D_p}(\beta)$, $-C_{D_p}(S_r)$, $-C_{D_p}(WI, \alpha)$, and $-C_{D_p}(S_{fw})$ for summing amplifier 134 are contoured so that such signals in summation represent the coefficient of parasitic drag $C_{D_p}$ for varying conditions of flight. Amplifier 134 wherein the aforementioned signals are summed connects to the primary 135' of a transformer 136' having a secondary winding 137' which provides output voltage $+C_{D_p}$ representing the coefficient of parasitic drag at its positive output terminal.

The voltage $+C_{D_p}$ is fed to one end of potentiometer 200 in the ($V_t^2$) servo system, potentiometer 200 having its other end connected to ground. The potentiometer includes slider contact 151 which is moved along the potentiometer card according to the operation of the ($V_t^2$) servo for deriving a voltage representing parasitic drag. Such derived voltage is fed over line 152 to the slider contact 27 of the potentiometer 29 which is a dividing potentiometer having its slider contact 27 positioned according to the setting of aircraft loading dial 18'. The potentiometer has an output voltage which is fed over line 153 to the amplifier 2 to provide the input signal $$+\frac{D_p}{m}$$

for the amplifier representing parasitic drag divided by aircraft mass.

As has been hereinbefore indicated, parasitic and induced drag items affecting air speed are in accordance with our invention separately computed as input signals $$+\frac{D_p}{m} \text{ and } +\frac{D_i}{m}$$

respectively to the ($V_t$) servo amplifier 2. As stated, the factors of side-slip ($\beta$), rudder angle ($S_r$), wing ice (WI), and flap angle ($S_{fw}$) are taken into account in the derivation of the parasitic drag item $$+\frac{D_p}{m}$$

and the manner of its derivation has been set forth. The item of induced drag $$+\frac{D_i}{m}$$

is computed according to the formula:

$$\frac{D_i}{m} = Kn\frac{C_L}{e}$$

where $n$ is the lift experienced by the airplane divided by the weight of the airplane, $C_L$ is the coefficient of lift, $e$ is the commonly used span-efficiency factor and $$K = g\frac{S}{\pi b^2}$$

$g$ being the acceleration of gravity, S the projected wing area and $b$ the wing span.

The quantity $n$, termed normal acceleration included in the above formula for $$\frac{D_i}{m}$$

is computed in a positioning servo ($n$) designated by reference character 154. The normal acceleration servo ($n$) includes servo amplifier 155 having an input line 156 which connects with lines 99 and 100 whereby amplifier 155 is provided with input signal $$+\frac{L}{m}$$

which determines normal acceleration. The only other input signals to amplifier 155 are the feed-back and answer signal $e_{fb}$ and $-n$ respectively so that the servo is caused to operate to a position representative of normal acceleration. As shown, answer signal $-n$ is derived at slider contact 157 which is positioned along the potentiometer card 158 according to the operation of the servo, the potentiometer card 158 being energized at opposite ends by the A. C. voltages +E and —E respectively and being connected to ground at its mid-point. The normal acceleration servo ($n$) includes a potentiometer 159 having one end connected over lines 160 and 94 to the positive output terminal of the secondary winding 93 of transformer 92 and having its other end connected to the negative output terminal of secondary winding 93. The potentiometer card is thereby energized at opposite ends by the voltages $+C_L$ and $-C_L$ respectively, and the card is grounded at its mid-point. Potentiometer 159 has a slider contact 162 which is moved along the potentiometer card according to the operation of the normal acceleration servo ($n$), a voltage being derived at the slider contact 162 representing the product $nC_L$ of normal acceleration and coefficient of lift which voltage except for the constant $K$ and the term $e$ which may be taken as a constant in the aforementioned formula represents the parasitic drag item $$\frac{D_i}{m}$$

The voltage at slider contact 156 is fed over line 163 to servo amplifier 2 of the ($V_t$) servo, and the constants are taken into account by means of a suitably selected input resistor to provide amplifier 2 with input signal $$\frac{D_i}{m}$$

The input signals $$\frac{T}{m}$$

$+g \sin \theta$, $-g \sin \alpha$, $$+\frac{D_p}{m} \text{ and } +\frac{D_i}{m}$$

which are derived in the manner set out in the specification according to the operation of various simulated aircraft controls and the positions of instructor's controls cause the ($V_t$) servo to be operated to a position which is representative of true air speed. In accordance with the operation of the ($V_t$) servo, slider contact 15 of potentiometer 7 is positioned along the potentiometer card 7 which is energized at one end by the A. C. voltage $-E$ and is connected at its other end to ground. A voltage is derived at its slider contact 15, such voltage being determined according to computed true air speed. The slider contact 15 connects over line 164 and resistor 165 to amplifier 166 which amplifier connects with the primary 167 of a transformer 168 having a secondary winding 169 providing output voltages $+V_t$ and $-V_t$ at its positive and negative terminals respectively, such output voltages representing true air speed.

The voltage $+V_t$ representing true air speed is utilized to operate a simulated air speed indicator 170, means however, being provided to take altitude into account since air speed indicators do not register true air speed, but rather true air speed less an amount due to the effect of altitude on the operation of the instrument. Such means includes altitude servo ($h$) bearing the reference character 171. The altitude servo ($h$) includes servo amplifier 172 having input signals $$-\frac{\dot{h}}{V_t}$$

$-\sin \alpha$, and $+\sin \theta$. Input signal $$-\frac{\dot{h}}{V_t}$$

is derived as the output voltage of potentiometer 6 which is a dividing potentiometer having a ground connection through resistor 173 near one end. The slider contact 14 of potentiometer 6 is connected over line 174 with the winding 175 of the altitude servo generator so that the voltage at the slider contact represents as a negative quantity rate of change of altitude, i. e. $-\dot{h}$. This signal from the servo generator is by reason of the movement of slider contact 14 along potentiometer card 6 modified to provide the output signal of the potentiometer which is fed over line 176 to the amplifier as feed-back signal $$-\frac{\dot{h}}{V_t}$$

The potentiometer 126 of the angle of attack servo ($\alpha$) has its slider contact 125 connected over line 128 and line 177 to amplifier 172 to provide input signal $-\sin \alpha$, and potentiometer 42 of the pitch servo ($\theta$) has its slider contact 41 connected over lines 43 and 178 to the altitude servo amplifier 172 to provide input signal $+\sin \theta$. The altitude servo ($h$) which is an integrating servo is caused to operate according to the input signals to a position which is representative of aircraft altitude.

As shown, the altitude servo includes potentiometer card 179 which connects at one end through resistor 180 to ground and connects at its other end over line 181 with the positive output terminal of secondary winding 169 having $+V_t$ as the output voltage. The potentiometer 179 includes slider contact 182 which is moved along the potentiometer card 179 in accordance with the operation of the altitude servo to derive a voltage which is determinative of indicated air speed. Slider contact 182 connects with the air speed meter 170, which may be a voltmeter, through a rectifier 183, the air speed meter being properly calibrated to register indicated air speed in accordance with the derived voltage at slider contact 182.

The derived voltage at slider contact 182 of the altitude potentiometer 179 provides for the operation of the $V_i^2$ servo 45 which has been hereinbefore referred to in connection with the derivation of the items of parasitic and induced drag $$+\frac{D_p}{m} \text{ and } +\frac{D_i}{m}$$

respectively, and the gravity component $-g \sin \alpha$. Slider contact 182 connects over line 184 with the servo amplifier 185 of the ($V_i^2$) servo to provide the input signal $+V_i$ representing indicated air speed. The other input signals to amplifier 185 are the feed-back signal $e_{fb}$ from the servo generator, and the answer signal $-V_i$ derived at slider contact 186 of the square root contoured potentiometer 187, the potentiometer being connected at one end to the A. C. voltage $-E$ and being connected at its other end to ground. As shown, the answer signal is fed from the slider contact 186 to amplifier 185 over the line 189. Accordingly, the ($V_i^2$) servo which is an answer servo with generator feed-back is operated to a position representing indicated air speed squared, $V_i^2$.

It should be understood that this invention is not limited to specific details of construction and arrangement thereof herein illustrated, and that changes and modifications may occur to one skilled in the art without departing from the spirit of the invention.

What is claimed is:

1. In aircraft training apparatus having flight computing means adapted to compute air speed, angle of attack, and sideslip according to the operation of simulated flight controls including a rudder control and a flap control, a system for deriving a signal representing the effect of parasitic drag on air speed, comprising means for computing coefficient of parasitic drag as a function of sideslip, rudder angle, angle of attack, and flap angle, means for computing indicated air speed squared, means for computing aircraft mass, and means for deriving a signal representing the effect of parasitic drag on air speed according to the computed values of coefficient of parasitic drag, indicated air speed squared and aircraft mass.

2. In an aircraft trainer having a plurality of controls operable by a student pilot including a wing flap control, function generating means associated with each of said controls for deriving an electrical signal in accordance with the position of the associated control, a plurality of computing systems respectively producing output signals representing computed aerodynamic factors determinative of the simulated flight responsive to input signals thereto derived from others of said computing systems and from said function generating means, including an angle of attack computing system and a thrust coefficient computing system: the improvement of provision of a further computing system for accurately computing coefficient of lift of the simulated flight for utilization of an output signal thereof representative of computed coefficient of lift as an input signal to another of said systems, comprising electrical signal combining means delivering said computed coefficient of lift output signal, means to apply to the input side of said combining means a signal derived from the wing flap function generating means, means to apply to the input side of said combining means a signal representative of said computed angle of attack, and means to apply to the input side of said combining means a signal representative of said computed thrust coefficient.

References Cited in the file of this patent

UNITED STATES PATENTS

| | | |
|---|---|---|
| 2,514,770 | Kittredge | July 11, 1950 |
| 2,584,261 | Davis et al. | Feb. 5, 1952 |
| 2,636,285 | Fogarty et al. | Apr. 28, 1953 |